United States Patent
Dadam et al.

(10) Patent No.: US 10,844,762 B2
(45) Date of Patent: Nov. 24, 2020

(54) METHOD FOR VARIABLE POSITION EXHAUST TUNING VALVE DIAGNOSTICS

(71) Applicant: Ford Global Technologies, LLC, Dearborn, MI (US)

(72) Inventors: Sumanth Dadam, Novi, MI (US); Sanyam Sharma, Dearborn, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 15/792,666

(22) Filed: Oct. 24, 2017

(65) Prior Publication Data

US 2019/0120101 A1   Apr. 25, 2019

(51) Int. Cl.
| | | |
|---|---|---|
| F01N 1/16 | (2006.01) | |
| F01N 9/00 | (2006.01) | |
| F01N 13/04 | (2010.01) | |
| F01N 11/00 | (2006.01) | |

(52) U.S. Cl.
CPC ............. *F01N 1/163* (2013.01); *F01N 1/166* (2013.01); *F01N 1/168* (2013.01); *F01N 9/00* (2013.01); *F01N 11/00* (2013.01); *F01N 13/04* (2013.01); *F01N 2240/36* (2013.01); *F01N 2550/00* (2013.01); *F01N 2900/06* (2013.01)

(58) Field of Classification Search
CPC .......... F01N 1/163; F01N 1/166; F01N 1/168; F01N 13/04; F01N 9/00; F01N 2550/00; F01N 2240/36; F01N 2900/06; F02D 41/042; F02D 41/221; Y02T 10/47
USPC ......................................................... 60/277
See application file for complete search history.

(56) References Cited

U.S. PATENT DOCUMENTS

| | | | |
|---|---|---|---|
| 6,662,554 B2 | 12/2003 | Sheidler et al. | |
| 7,983,834 B2 * | 7/2011 | Blumendeller | ..... F02D 41/0055 701/114 |
| 9,441,568 B2 | 9/2016 | Ossareh et al. | |
| 9,835,094 B2 * | 12/2017 | Lahti | ................... F02D 41/0002 |
| 2017/0051684 A1 * | 2/2017 | Lahti | ................... F02D 41/0007 |

\* cited by examiner

*Primary Examiner* — Thai Ba Trieu
*Assistant Examiner* — Dapinder Singh
(74) *Attorney, Agent, or Firm* — Geoffrey Brumbaugh; McCoy Russell LLP

(57) ABSTRACT

Methods and systems are provided for adjusting and troubleshooting an adjustable exhaust valve of a variable exhaust tuning system. In one example, a method may include comparing engine startup conditions to engine conditions of a last engine off event, adjusting a position of the adjustable exhaust valve, and providing a diagnostic summary to a vehicle operator based upon the results of the comparison and adjustment.

20 Claims, 6 Drawing Sheets

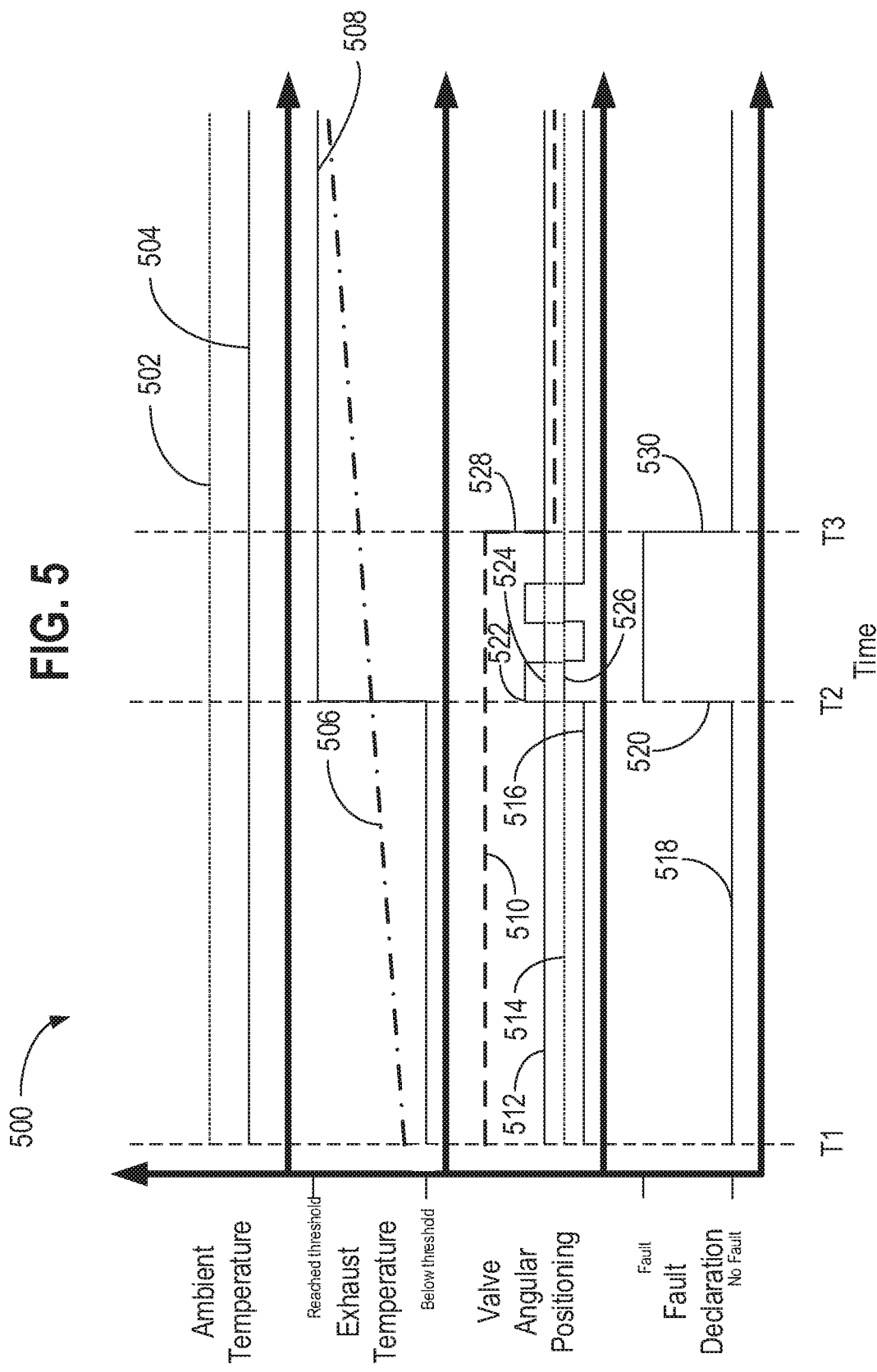

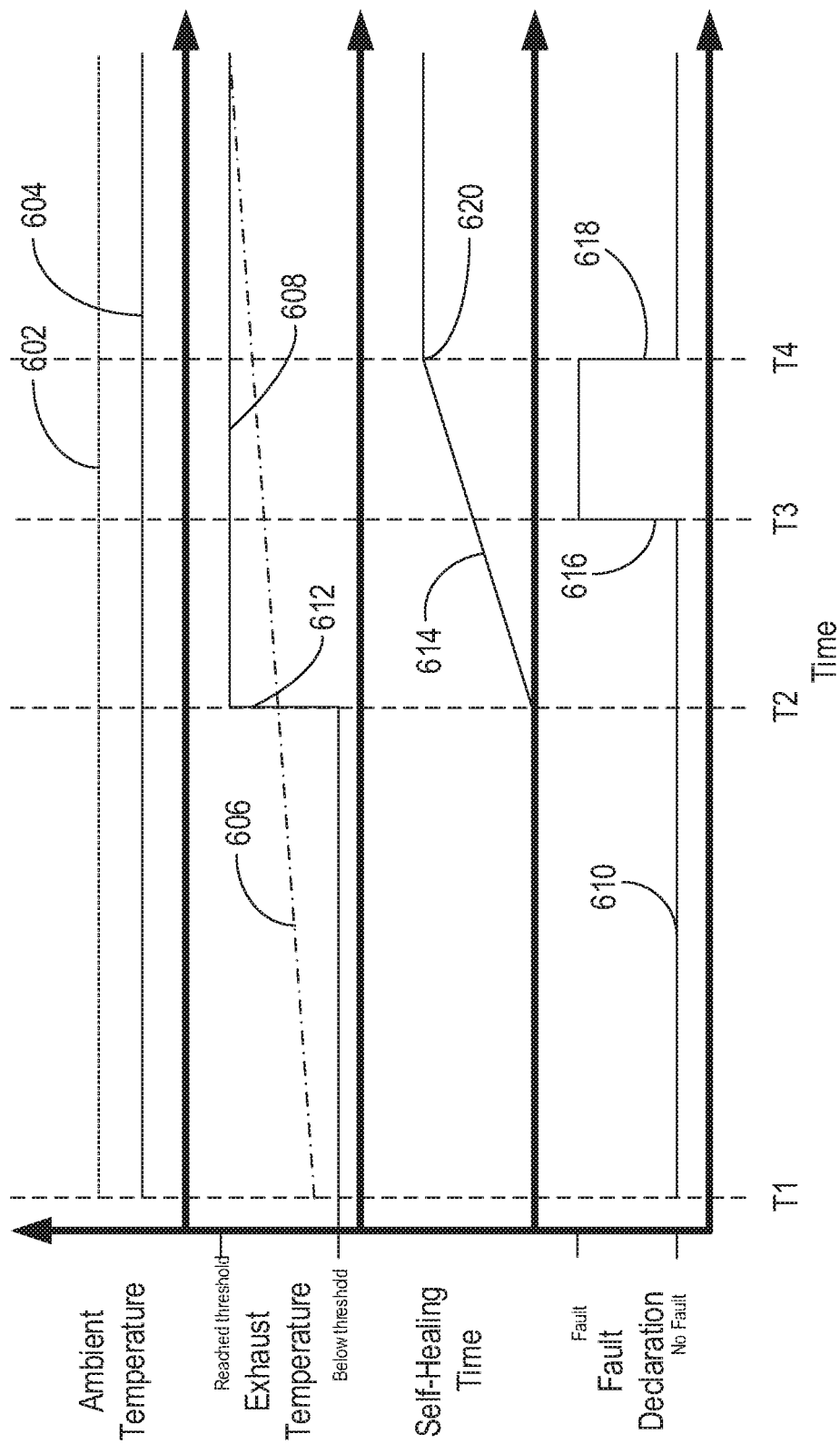

METHOD FOR VARIABLE POSITION EXHAUST TUNING VALVE DIAGNOSTICS

FIELD

The present description relates generally to methods and systems for robust diagnostics of a variable exhaust tuning system configured to improve vehicle operator experience.

BACKGROUND/SUMMARY

In high-powered internal combustion engines, variable exhaust pipe tuning systems are desired to control the noise output levels of motor vehicles equipped. Additionally, a vehicle operator's ability to adjust the sound levels, or noise, vibration and harshness (NVH) from a control unit within the vehicle, may lead to an improved driving experience wherein the driver may select their preferred sound levels. As an example, a variable exhaust tuning system may comprise a resonator and one or more mufflers fluidically connected to the resonator. A muffler may include one or more adjustable exhaust valves and the angle of the valve may be adjusted automatically with a motor responsive to settings by the vehicle operator. In some examples, further opening the adjustable exhaust valve may decrease back pressure in the muffler and/or resonator and increase the noise level, while in other examples, further closing the valve may increase back pressure in the muffler and/or resonator and decrease the noise level.

An issue that may arise with the abovementioned variable exhaust tuning systems is that one or more adjustable exhaust valves may become stuck open or closed or in a fixed position, causing performance issues related to engine performance or NVH. If one or more adjustable exhaust valves becomes stuck, the quality of the driving experience may significantly decrease and the variable exhaust tuning system may incur degradation due to undesirable buildup of exhaust gases or backpressure. Thus, as recognized by the inventors herein, providing robust diagnostics for the variable exhaust tuning system may help the operator of the vehicle determine if the problem can be solved via the variable exhaust tuning system's self-healing and/or retry procedures or if the vehicle requires maintenance.

Other attempts to address issues related to variable exhaust tuning systems is shown by Sheidler et al. in U.S. Pat. No. 6,662,554 B2. Therein, the Sheidler et al. patent provides teachings related to a damper for an exhaust system providing volume attenuation. Sheidler et al. provides systems and methods to electronically or manually adjust the volume attenuation of exhaust gases from a combustion engine.

However, the inventors herein have also recognized potential issues with such systems. As one example, variable exhaust tuning systems may experience elevated temperatures during normal operation of a motor vehicle and the systems may heat up significantly. However, when the engine is turned off, and if temperatures are low enough, condensation and ice may form within the variable exhaust tuning system. In an example, condensation and ice may lead to adjustable exhaust valves becoming stuck when ambient air temperatures are below freezing.

In one example, the issues described above may be addressed by a method for an adjustable engine-exhaust valve, comprising: monitoring engine off time and checking for one or more entry conditions at engine startup, operating with the valve being stuck, and responsive to the valve being stuck: during selected engine start-up conditions and after sufficient engine-off time, setting an error code associated with the one or more entry conditions upon an exhaust temperature reaching an exhaust temperature threshold, commanding the adjustable exhaust valve to a first commanded valve position, and based upon a current valve position of the adjustable exhaust valve being within a tolerance band of a first commanded valve position, clearing the error code.

In this way, improved diagnostic and troubleshooting methods for exhaust valves may provide improved valve self-healing, prevent false errors from being latched, eliminate unnecessary effort from vehicle owners of driving error-latched vehicle to a service station, and reduce unnecessary vehicle technicians' effort for resetting and clearing false latched, or permanent, errors which may not be reset or cleared without a manufacturer-approved technician.

It should be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a graph representing sample conditions for a stuck valve diagnosis.

FIG. 6 shows a graph representing alternative sample conditions for a stuck valve diagnosis.

DETAILED DESCRIPTION

The following description relates to systems and methods for diagnosing a stuck adjustable exhaust valve and delaying and preventing setting an alarm based upon at least one of an ambient and exhaust temperature. Methods include launching self-healing routines, cycling adjustable exhaust valve positioning, and checking sensor and actuator feedback.

Figure 1:
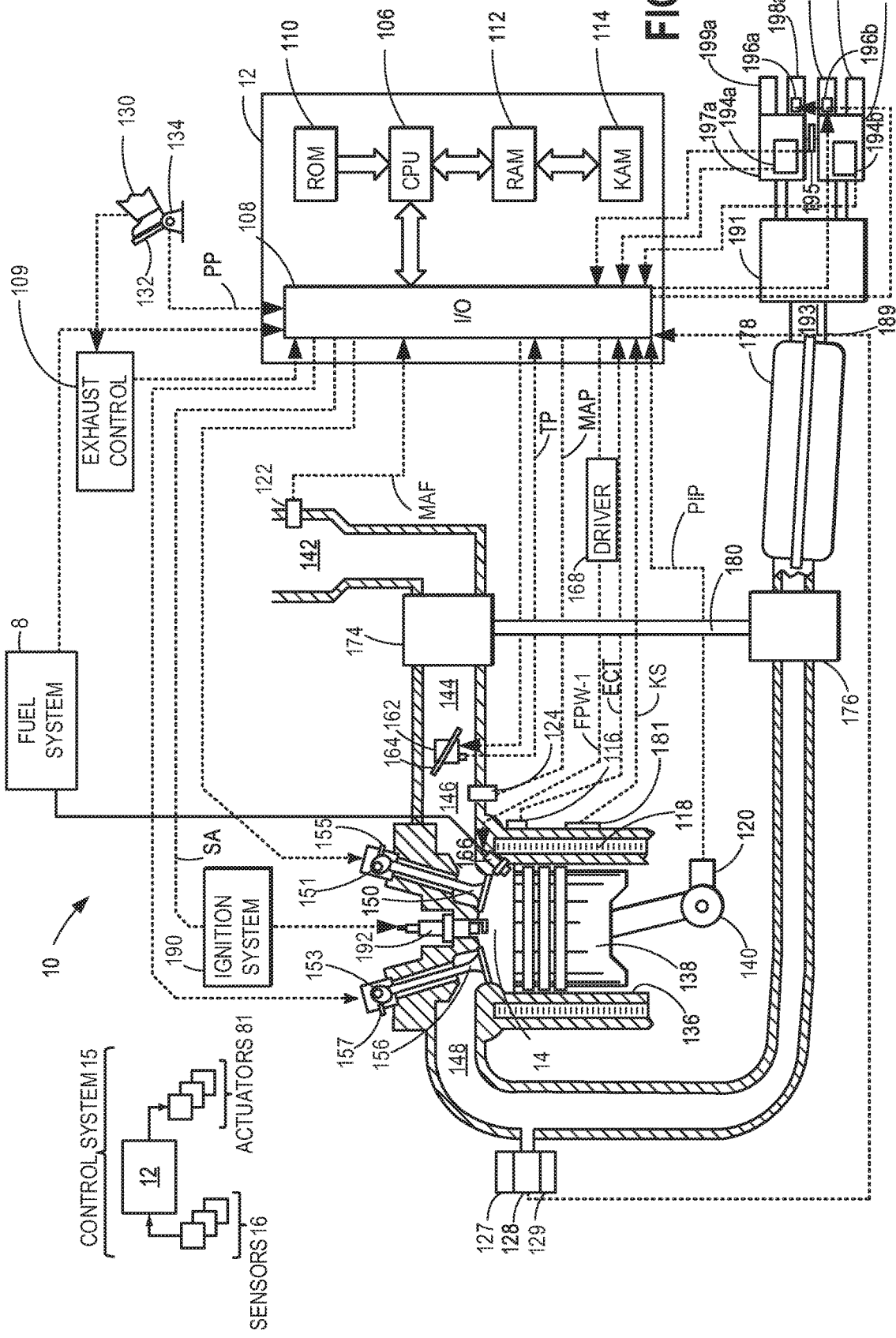
FIG. 1 shows an example internal combustion engine with variable exhaust tuning system.
Figure 2:
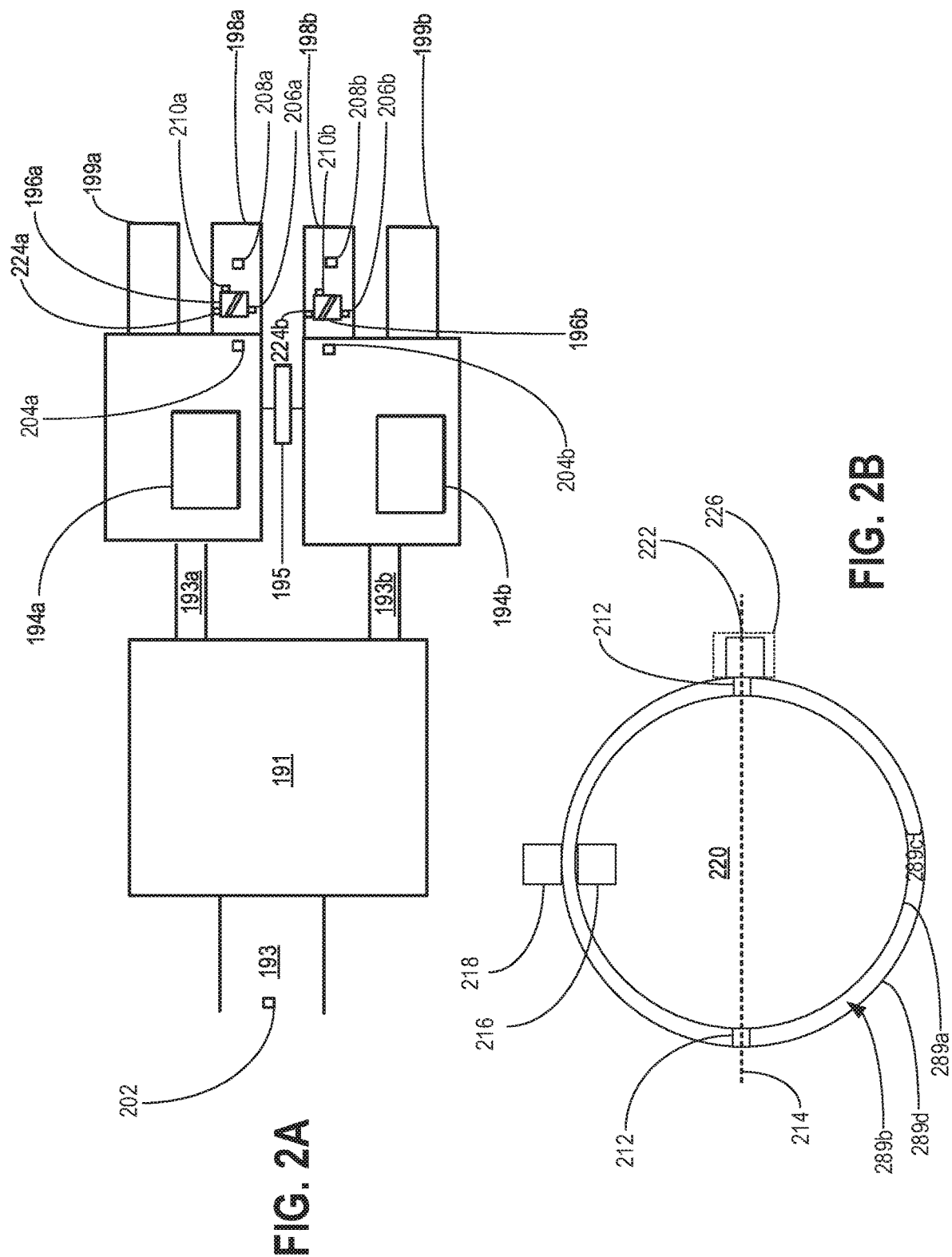
FIG. 2A shows an alternative, enlarged view of an example variable exhaust tuning system.
FIG. 2B shows an upstream-looking point of view from the downstream end of either a first or second muffler inner exhaust port.

FIGS. 1, 2A, and 2B may be discussed collectively to provide a clear description. FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust temperature sensor 129 and exhaust constituent sensor 127 off exhaust passage 148 upstream of emission control device 178. In an alternate embodiment, these sensors may not be located adjacent to one another and may be dispersed through exhaust passage 148. Exhaust gas sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof. Exhaust gas sensor 128, exhaust temperature sensor 129 and exhaust constituent sensor 127 provide input to controller 12 via input/output ports 108.

Exhaust tuning resonator 191 may receive exhaust gases from emission control device 178 via post-treatment passage 193 having post-treatment walls 189. Resonator 191 may be fluidically coupled to emission control device 178 via post-treatment passage 193. In an example, resonator 191 may also be fluidically coupled via a first post-resonator passage 193a to a first muffler 197a and resonator 191 may also be fluidically coupled via second post-resonator passage 193b to a second muffler 197b. In an example, the first muffler 197a may include a first temperature sensor and/or delta pressure sensor 194a and the second muffler 197b may include a second temperature sensor and/or delta pressure sensor 194b. In an example the first and second temperature sensor and/or delta pressure sensors 194a, 194b may track receive temperature and pressure input of the exhaust gases of the variable exhaust tuning system which my change over time and as a position of one or more adjustable exhaust valves 196a, 196b changes. In another example, the first muffler 197a may be fluidically connected to a first muffler inner exhaust port 198a and a first muffler outer exhaust port 199a. In another example, the second muffler 197b may be fluidically connected to a second muffler inner exhaust port 198b and a second muffler outer exhaust port 199b. In an example, a microphone 195 may be located between the first and second mufflers 197a, 197b and may be attached to first and second mufflers 197a and 197b via supports. In another example, the microphone may be attached to a bottom surface of the vehicle. In an example, the bottom surface of the vehicle may face the road on which the vehicle is travelling and the bottom surface of the vehicle may face away from the cabin of the vehicle.

In a further example, the first muffler inner exhaust port 198a and the second muffler inner exhaust port 198b may, respectively, include a first adjustable exhaust valve 196a and a second adjustable exhaust valve 196b. In an example, the first and second adjustable exhaust vales 196a, 196b may be communicatively coupled to the controller 12 via input/output ports 108. In an example, the first and second adjustable exhaust valves 196a, 196b may be damper valves, butterfly valves, globe valves, ball valves, poppet valves, quarter turn valve, compression valve or other valve controlled by an actuator (the actuator to be discussed in more detail with respect to FIGS. 2A and 2B). In an example, the first temperature sensor and/or delta pressure sensor 194a and the second temperature sensor and/or delta pressure sensor 194b may each be communicatively coupled to controller 12 via input/output ports 108. In an example, the first and second adjustable exhaust valves 196a and 196b may be controlled by an operator of the motor vehicle to adjust a sound experience of the vehicle. In an example, adjusting the first and second adjustable exhaust valves 196a and 196b may adjust the sound level and/or back pressure of the exhaust system of the vehicle.

In an example, the resonator 191, post-resonator passages 193a and 193b, mufflers 197a and 197b, outer exhaust ports 199a and 199b, and inner exhaust ports 198a and 198b may be configured and/or shaped to provide adjustable exhaust tuning, or increased and decreased exhaust sound levels, via adjustment of adjustable exhaust valves 196a, 196b.

In an example, the first and second adjustable exhaust valves 196a and 196b may be adjustable by the vehicle operator 130 via exhaust control 109. Exhaust control 109 may be controllable by the vehicle operator 130 to adjust an angular positioning of the first and second adjustable exhaust valves 196a and 196b. The exhaust control 109 may include one or more exhaust valve settings which may be selectable by the vehicle operator 130. As an example, a vehicle operator 130 selection of an exhaust valve setting may command the first and second adjustable exhaust valves 196a and 196b to the angular positioning associated with the exhaust valve setting of the exhaust control 109. As an example, exhaust control 109 may be communicatively coupled to the controller 12 via input/output ports 108. As an example, exhaust control 109 may command, via vehicle operator 130 selection of the exhaust valve setting, the first and second adjustable exhaust valves 196a and 196b to between and including angular positioning wherein the first and second adjustable exhaust valves 196a and 196b may be either completely open or completely closed.

In another example, resonator 191 may be configured to receive exhaust gases directly from exhaust passage 148 downstream of exhaust turbine 176 and the first and second mufflers 197a, 197b may each an include emission control device 178 within the first and second mufflers 197a, 197b. In such an example post-treatment passage 193 may fluidically couple exhaust turbine 176 to resonator 191.

Exhaust temperature may be measured by one or more temperature sensors such as exhaust temperature sensor 129 located in exhaust passage 148 and temperature sensors contained within the variable exhaust tuning system comprising at least post-treatment passage 193, resonator 191, post-resonator passages 193*a* and 193*b*, mufflers 197*a* and 197*b*, outer exhaust ports 199*a* and 199*b*, and inner exhaust ports 198*a* and 198*b*. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize some form of variable valve timing (VVT) such as one or more of cam profile switching (CPS), variable cam timing (VCT), such as twin independent variable cam timing (tiVCT), and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector 170, indicated as a variation in dotted line, providing fuel into the intake port upstream of cylinder 14.

Fuel may be delivered by the injector to the cylinder during a single cycle of the cylinder. Furthermore, for a single combustion event, multiple injections of the delivered fuel may be performed per cycle. The multiple injections may be performed during the compression stroke, intake stroke, or any appropriate combination thereof.

As described above, FIG. 1 shows one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; and knock signal (KS) from knock sensor 181. Knock sensor 181 may alternatively be located on the cylinder head or may be a sensor to detect vibrations from knock in crankshaft 140. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed. Engine 10 may be controlled at least partially by a control system 15 including controller 12. Controller 12 may receive various signals from sensors 16 coupled to engine 10, and send control signals to various actuators 81 coupled to the engine and/or vehicle. The various sensors may include, for example, various temperature, pressure, and air-fuel ratio sensors. The various actuators may include, for example, valves, throttles, and fuel injectors.

As mentioned above, sensors 16 may include any temperature, pressure, positioning, humidity or contacting sensors or any other sensors described herein. In an example, sensors 16 may include one or more microphones. Actuators 81 may include actuators used to control the first and second adjustable exhaust valves 196*a*, 196*b*. Controller 12 may be a microcomputer, including a microprocessor unit, input/output ports, an electronic storage medium for executable programs and calibration values. Controller 12 may be programmed with computer readable data representing instructions executable to perform the methods described below as well as other variants that are anticipated but not specifically listed.

For example, adjusting the first and second adjustable exhaust valves 196*a*, 196*b* may include adjusting actuators 81 coupled to adjustable exhaust valves 196a, 196b. In an example, to adjust an angle of an adjustable exhaust valve 196a, 196b, or herein described valve 220, actuators 224a, 224b, 222 may open or close the valve by providing torque via a rotational rod connected to valve 220 along the valve rotational axis 214, further described below with respect to FIG. 2B.

FIG. 2A shows an example alternative view of the variable exhaust tuning system. In an example, the variable exhaust tuning system may include sensors 16 such as post-catalyst sensor 202, pre-flap sensors 204a and 204b, pivot sensors 206a and 206b, post-flap sensors 208a and 208b, and first valve positioning sensor 210a and second valve positioning sensor 210b, all located within the variable exhaust tuning system. In an example, valve positioning sensors 210a and 210b may be located on the external housing of valve 220 and in an example, the second valve positioning sensor 210b may be located on the valve 220. In another example, the valve positioning sensors 210a and 210b may be included within the actuator 222. Sensors 202, 204a, 204b, 206a and 206b, and 208a and 208b may, in an example, all be temperature and/or pressure sensors and the exhaust temperature and exhaust back pressure may be measured by one or more sensors. In an example, sensors 202, 204a, 204b, 206a and 206b, and 208a and 208b may be communicatively coupled to controller 12 via input/output ports 108 and the controller may determine a temperature and/or back pressure model for the variable exhaust tuning system based upon the input provided from the plurality of sensors. In an example, the sensors mentioned herein with respect to FIG. 2A may be installed within the post-treatment walls 189, wherein post-treatment walls 189 may form the structure of the different bodies of the variable exhaust tuning system. In an example the post-treatment walls 189 may be formed from any desirable metal such as aluminum or steel or any desirable alloy. In an example, any of the sensors 202, 204a, 204b, 206a and 206b, and 208a and 208b may be included within sensors 16 of the control system. In a further example, post-treatment walls 189 may further comprise an inner post-treatment layer 289a, a post-treatment wall material 289b having a post-treatment wall thickness 289c, and an outer post-treatment wall layer 289d.

In an example, the variable exhaust tuning system may comprise a plurality of actuators 81. In an example, adjustable exhaust valves 196a and 196b may be respectively adjusted by a first valve actuator 224a and a second valve actuator 224b. First and second valve actuators 224a, 224b may be communicatively coupled to controller 12. In an example, control system may include controller 12 which may receive signals from the sensors 16 and employ actuators 81 to adjust engine operation and/or variable exhaust tuning system operation based on the received signals and instructions stored on a memory of the controller further described herein.

FIG. 2B shows an upstream-looking point of view from the downstream end of either a first or second muffler inner exhaust port 198a or 198b (in FIG. 2B, as an example, shown as 198a), and in such an example, either adjustable exhaust valves 196a or 196b may comprise a butterfly, damper, quarter turn, or compression valve represented by valve 220. In some cases, the positioning of adjustable exhaust valves 196a, 196b may be adjusted by adjustable exhaust valve actuators 224a, 224b which may be represented in FIG. 2B by actuator 222. Actuator 222 may, in an example, adjust the position or rotation angle of valve 220 along a valve rotational axis 214, wherein the rotational axis includes a rotational rod in order to provide turning of the valve 220 via actuator 222. In an example, the rotational rod of valve rotational axis 214 may be attached to and passing through valve 220 or it may be built into valve 220 as a single body. Actuator 222 may optionally or additionally include a valve stuck sensor 226.

In another example, FIG. 2B includes one or more valve positioning sensors 212 which may be positioned along the valve rotational axis 214 of the valve and they may also be attached to the rotational rod running along valve rotational axis 214. In an example, valve positioning sensors 212 may provide continuous indication of valve 220 position. In addition, valve positioning sensors 212 may be communicatively coupled to controller 12 via input/output ports 108. In an example, valve 220 may only include a single valve positioning sensor 212.

Instructions for carrying out methods 300, 400, and the rest of the methods included herein may be executed by the controller 12 based on instructions stored on a memory of the controller and in conjunction with signals received from sensors of the engine system, such as the sensors described above with reference to FIGS. 1, 2A and 2B. The controller may employ engine actuators of the engine system to adjust engine operation and variable exhaust tuning system operation according to the methods described below.

Figure 3:
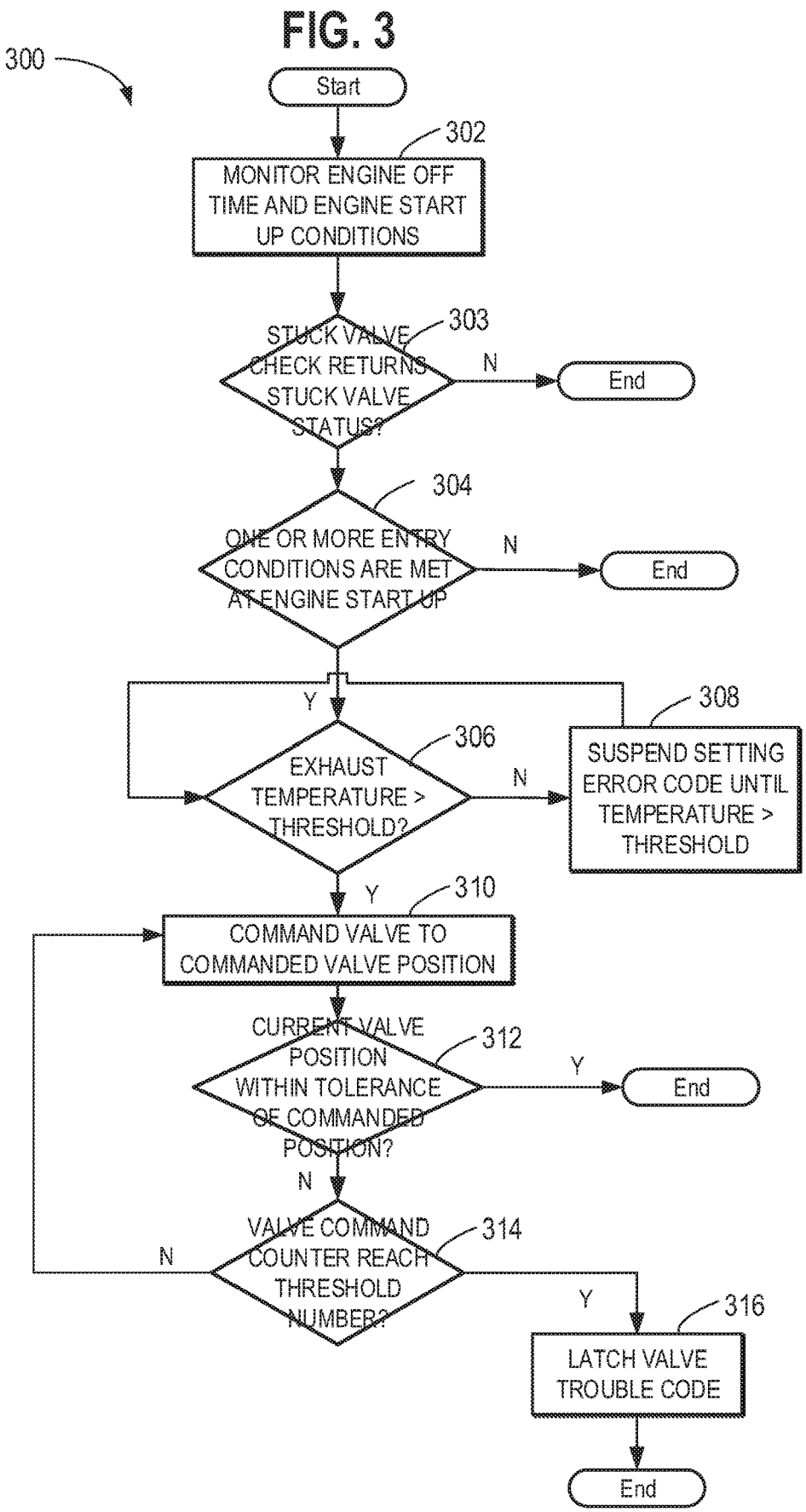
FIG. 3 shows a flow chart depicting a method of diagnosing a stuck valve.

FIG. 3 shows a high-level flow chart detailing method 300 for providing stuck adjustable exhaust valve diagnostics with a valve position sensor. In an example, the method 300 may begin at 302 wherein at an engine-off event, the controller 12 may determine an engine-off time and/or engine-off conditions at the engine-off event. In an example, engine-off conditions may include any of exhaust temperature, ambient temperature, adjustable exhaust valve positioning, or any other condition measured by sensors 16 at engine-off conditions. Following the engine-off event, controller 12 may determine an engine-on time and engine-on conditions via sensors 16 when the engine is next started up.

Next, at 303 the controller 12 may execute a stuck valve check via input/output ports 108 with an actuator 222 of valve 220 if the actuator 222 reports a stuck status. In an example, the stuck valve check may comprise the controller 12 commanding the actuator 222 to move the valve 220 to a check valve position or to adjust the valve 220 position by a programmable check valve adjustment. If the valve 220 is stuck or unable to move to the check valve position or by the programmable check valve adjustment, the actuator 222 may send a stuck valve status to the controller 12 via input/output ports 108. In an example, the valve 220 may be rotated to the check valve position or rotated by the programmable check valve adjustment via actuator 222 rotating the rotational rod. In another example, one or more of the valve positioning sensors 210a and 210b may be used to determine that the stuck valve check has revealed valve 220 to be stuck. In an example the valve positioning sensors 210a and/or 210b may be used to determine that the valve 220 was unable to move the check valve positioning or have the actuator 222 adjust the valve 220 position by the programmable check valve adjustment. In an example, if at 303, the actuator 222 does not send the stuck valve status and upon executing the stuck valve check (wherein the valve is moved to the check valve position or adjusted by the programmable check valve adjustment) then the method 300 may end.

In an example, method 300 may proceed next to 304 where the controller may determine if one or more entry conditions are met at engine start, or engine-on. In a non-limiting example, entry conditions may comprise any of the following: an actuator of an adjustable exhaust valve 196a or 196b reporting the stuck valve status; a humidity sensor of the variable exhaust tuning system reading a water concentration higher than a threshold water concentration at the most recent engine-off time; a vehicle soak time being greater than a calculated amount of time for ice formation while engine is off, wherein the calculated amount of time for ice formation is based upon ambient temperature and the water concentration sensed by the humidity sensor of the variable exhaust tuning system; a current ambient temperature being either greater than (a hot day) or less than (a cold day) a threshold temperature; and an exhaust volume level failing to fall between a first volume threshold and a second volume threshold associated with each commanded position of a valve 220. In an example, the controller may determine that no entry conditions are met and method 300 may end. In another example, the controller 12 may determine that one or more entry conditions are met via data obtained via input/output ports 108 by sensors 16 and the method 300 may proceed to 306.

At 306, the controller 12 may determine if an exhaust temperature is equivalent to or above an exhaust temperature threshold. In an example, controller 12 may determine the exhaust temperature from data received via input/output ports 108 from any of the temperature sensors of the variable exhaust tuning system described above with respect to FIG. 2A. In an example, the controller 12 may determine that the exhaust temperature has not yet reached the threshold exhaust temperature and the method 300 may proceed to 308 wherein the controller 12 may suspend setting a stuck valve code until the exhaust temperature has reached the exhaust temperature threshold. In an example, suspending setting the stuck valve code may allow for adjustable exhaust valve diagnostics to self-heal a potentially stuck valve or eliminate a "false-positive" stuck valve code in which an adjustable exhaust valve 196a, 196b may be reported as stuck but is not actually so. In an example, if the controller 12 has determined that the exhaust temperature has not yet reached the threshold exhaust temperature, the method 300 may return to 306 to check again if the exhaust temperature is equivalent to or is greater than the exhaust temperature threshold. In such an example, as the engine has been turned on by the vehicle operator 130, the exhaust temperature may increase over time. In an example, the method 300 may cycle between 306 and 308 as many times as necessary in order for the exhaust temperature to reach the threshold exhaust temperature. In an example, the method 300 may only cycle between 306 and 308 an allowed number of times before latching an exhaust error or temperature exhaust error, wherein one or more temperature sensors may be defective or inoperable, and the method 300 may then end or proceed to 310.

Method 300 may proceed to 310 when the controller 12 receives data via input/output ports 108 indicating that the exhaust temperature is equivalent to or greater than the threshold exhaust temperature. At 310, the controller 12 may measure a first measured valve position of a valve 220 and then command an adjustable exhaust valve 196a, 196b via adjustable exhaust valve actuators 224a, 224b to a commanded valve position either 50% less or 50% greater than the first measured valve position. In an example, the first measured valve position and commanded valve position and any other valve positions may be measured by valve positioning sensors 210a and 210b and the positions may be normalized valve positions wherein a range of normalized valve positions may range from 0% (completely closed) to 100% (completely open). After commanding the adjustable exhaust valve 196a, 196b to the commanded valve position, the controller may execute a retry logic wherein the valve may be commanded to an updated commanded position comprising alternate end-stop positions (0% and 100%) or any intermediate positions for a calibratable number of times.

Next, the method 300 may proceed to 312 wherein the controller 12 may run a threshold band check which may compare an updated measured position of the valve 220 with the updated commanded position of the valve 220. In an example, the controller 12 may run the threshold band check every 90 seconds during the execution of the retry logic. In an example, if the updated measured position of the valve 220 is within a tolerance band, or tolerance limit, of the updated commanded position then the method may 300 may end. In an example, if the updated measured position of the valve 220 is not within the tolerance band, or threshold, the controller 12 may proceed to 314. In an example, at 314 of the method 300, the controller 12 may add a command counter and execute a command counter check to see if the method 300 has reached a command counter threshold. In an example, the command counter threshold may be reset to zero at each vehicle start up. In an example, the command counter threshold may be programmed to a desired number of valve positioning commands.

If the controller 12 determines that the command counter threshold has been reached, method 300 may proceed to 316 wherein the controller 12 may latch a valve trouble code indicating to the vehicle operator 130 that there is an issue with one or more adjustable exhaust valves 196a, 196b. In a further example, if the controller 12 determines that the command counter threshold has not been reached, method 300 may revert to 310 and again command the valve 220 to the commanded valve position and this process may loop until either the updated measured position of the valve 220 is within the tolerance band of the updated commanded position or if the command counter check returns that the command counter threshold has been reached. After latching the valve trouble code, method 300 may end.

In an example, the calculated amount of time for ice formation may be obtained by assuming that the ice may be formed due to a certain quantity of water during a soak time, or the time between a most recent engine-off and an engine start wherein the temperature was below freezing. By using the known specific heat of water, estimating a mass of water can be accomplished following the formula: $Q=mc\Delta T$ and differentiating to solve for time for ice formation, the following formula may be used:

time for ice formation=(mass of water estimation)*
(specific heat transfer for water)*(last engine off
temperature−engine on temperature)/(power in
J/s)

In an example, sensors 16 of the variable exhaust tuning system may provide humidity and temperature measurements at an engine off event and may provide the mass of water estimation. In another example, the mass of water estimation may be provided as a calibratable and/or programmable number based upon the volume of the variable exhaust tuning system.

In a further example, the controller 12 may additionally use the microphone 195 to obtain sound and/or volume levels of the variable exhaust tuning system via input/output ports 108. In an example, vehicle operator 130 may be able to adjust a position of a valve between a number of positions in order to adjust the backpressure, and therefore volume level, of the variable exhaust tuning system. In an example, the vehicle operator 130 may be able to select between 4 different positions of valve 220 achieved by commanding actuator 222. In an example, the vehicle operator 130 may choose 4 different calibratable positions of valve 220, namely, "quiet", "normal", "sport", and "track", being in respective decreasing order of backpressure and increasing order of volume. In an example, each position of valve 220 associated with different calibratable positions may have an associated volume level as well as an upper volume threshold and lower volume threshold. In an example, if a live volume level from microphone 195 does not fall between the upper volume threshold and lower volume threshold of an associated volume level of a calibratable position of valve 220 then the controller 12 may set a volume error code. In a further example, the controller 12 may command the valve 220 to an updated volume positioning in order to adjust the live volume level so that it may fall between the upper and lower volume thresholds mentioned above. In an example, the controller 12 may further update the calibratable positions of valve 220 to updated calibratable positions based upon the adjustment made with respect to volume level, as mentioned above.

In a further example, as shown in FIG. 1, a first adjustable exhaust valve 196a may be located on a passenger's side of the vehicle and a second adjustable exhaust valve 196b may be located on a driver's side of the vehicle wherein the outer exhaust ports 199a and 199b, and inner exhaust ports 198a and 198b direct exhaust gases towards the rear of the vehicle and the resonator is located upstream of the exhaust ports and toward the front of the vehicle. In an example, a microphone 195 may be attached to a bottom of the vehicle and/or between the first and second exhaust ports. In an example, the microphone 195 may be capable of receiving stereo volume (i.e. left and right channels). In an example, volume diagnostics may include one or more of: commanding the first and second adjustable exhaust valves 196a, 196b to close wherein low volume should be detected; commanding the first adjustable exhaust valve 196a closed wherein the microphone 195 may detect an increase in volume from the passenger's side of the vehicle; and commanding the second adjustable exhaust valve 196b closed wherein the microphone 195 may detect an increase in volume from the driver's side of the vehicle. By running one or more of the above volume diagnostics, the controller 12 may be able to provide improved diagnostics and the controller 12 may declare a fault when the above conditions are not observed. Additionally delta pressure and/or temperature sensors 194a, 194b included within mufflers 197a, 197b may detect a difference in pressure and/or temperature when an adjustable exhaust valve 196a, 196b is commanded to a new position. In an example, when sensors 194a, 194b do not detect the difference in pressure and/or temperature when 196a, 196b are commanded to the new position, the controller 12 may also declare a fault.

Figure 4:
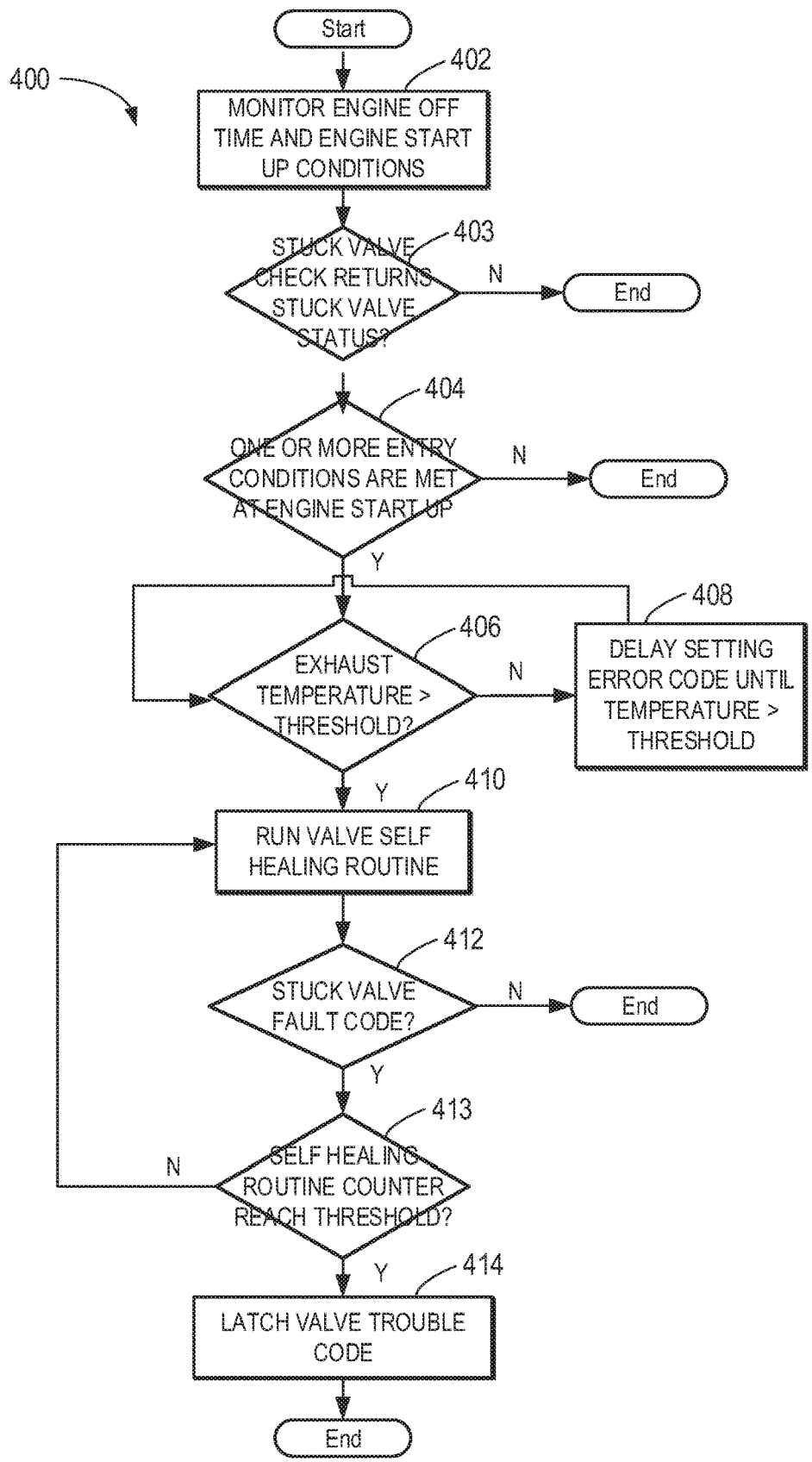
FIG. 4 shows a flow chart depicting an alternative method of diagnosing a stuck valve.

FIG. 4 shows a high-level flow chart detailing method 400 for providing stuck adjustable exhaust valve diagnostics without a valve position sensor. In an example, method 400 may begin at 402 wherein at an engine-off event, the controller 12 may determine an engine-off time and/or engine-off conditions at the engine-off event. In an example, engine-off conditions may include any of exhaust temperature, ambient temperature, adjustable exhaust valve positioning, or any other condition measured by sensors 16 at engine-off conditions. Following the engine-off event, controller 12 may determine an engine-on time and engine-on conditions via sensors 16 when the engine is next started up.

Next, at 403 the controller 12 may execute a stuck valve check via input/output ports 108 with an actuator 222 of valve 220 if the actuator 222 reports a stuck status. In an example, the stuck valve check may comprise the controller 12 commanding the actuator 222 to move the valve 220 to a check valve position or to adjust the valve 220 position by a programmable check valve adjustment. If the valve 220 is stuck or unable to move to the check valve position or by the programmable check valve adjustment, the actuator 222 may send a stuck valve status to the controller 12 via input/output ports 108. In an example, valve stuck sensor 226 may determine that the stuck valve check has revealed the valve 220 to be stuck and may communicate to the controller 12 that valve is stuck. In an example, the valve 220 may be rotated to the check valve position or rotated by the programmable check valve adjustment via actuator 222 rotating the rotational rod. In an example, if at 403, the actuator 222 does not send the stuck valve status and upon executing the stuck valve check (wherein the valve is moved to the check valve position or adjusted by the programmable check valve adjustment) then the method 300 may end.

In an example, method 400 may proceed next to 404 where the controller may determine if one or more entry conditions are met at engine start, or engine-on. In a non-limiting example, entry conditions may comprise any of the following: an actuator of an adjustable exhaust valve 196a or 196b reporting a stuck status; a valve stuck sensor 226 reporting a stuck valve status; a humidity sensor of the variable exhaust tuning system reading a water concentration higher than a threshold water concentration at the most recent engine-off time; a vehicle soak time being greater than a calculated amount of time for ice formation while engine is off, wherein the calculated amount of time for ice formation is based upon ambient temperature and the water concentration sensed by the humidity sensor of the variable exhaust tuning system; a current ambient temperature being either greater than (a hot day) or less than (a cold day) a threshold; and an exhaust volume level failing to fall between a first volume threshold and a second volume threshold associated with each commanded position of a valve 220. In an example, the vehicle soak time may be a duration of time during which a vehicle having a variable exhaust tuning system rests with the engine off having ambient temperature below freezing. In an example, the controller may determine that no entry conditions are met and method 400 may end. In another example, the controller 12 may determine that one or more entry conditions are met via data obtained via input/output ports 108 by sensors 16 and the method 400 may proceed to 406.

At 406, the controller 12 may determine if an exhaust temperature is equivalent to or above an exhaust temperature threshold. In an example, controller 12 may determine the exhaust temperature from data received via input/output ports 108 from any of the temperature sensors of the variable exhaust tuning system described above with respect to FIG. 2A. In an example, the controller 12 may determine that the exhaust temperature has not yet reached the threshold exhaust temperature and the method 400 may proceed to 408 wherein the controller 12 may suspend setting a stuck valve code until the exhaust temperature has reached the exhaust temperature threshold. In an example, suspending setting the stuck valve code may allow for adjustable exhaust valve diagnostics to self-heal a potentially stuck valve or eliminate a "false-positive" stuck valve code in which an adjustable exhaust valve 196a, 196b may be reported as stuck but is not actually so. In an example, if the controller 12 has determined that the exhaust temperature has not yet reached the threshold exhaust temperature, the method 400 may return to 406 to check again if the exhaust temperature is equivalent to or is greater than the exhaust temperature threshold.

In such an example, as the engine has been turned on by the vehicle operator 130, the exhaust temperature may increase over time. In an example, the method 400 may cycle between 406 and 408 as many times as necessary in order for the exhaust temperature to reach the threshold exhaust temperature. In an example, the method 400 may only cycle between 406 and 408 an allowed number of times before latching an exhaust error or temperature exhaust error, wherein one or more temperature sensors may be defective or inoperable, and the method 400 may then end or proceed to 410.

At 410, the controller 12 may execute a valve self-healing routine via input/output ports 108 to command the actuator 222 of valve 220 to toggle the valve a programmable number of times to return the valve to a normal state of operation. In an example, the valve may be toggled 11 times. In an example, a valve toggle may comprise the controller 12 commanding the actuator 222 of the valve 220 to completely open and completely close. In an example, the valve 220 is not reported as a stuck valve via the valve stuck sensor 226 or the actuator 222 when the valve successfully completes the programmable number of valve toggles. In an example, the valve 220 may be reported as stuck to the controller 12 via input/output ports 108 when the actuator 222 of the valve 220 reports that it cannot move, and issues a stuck valve code, or the stuck valve sensor 226 reports that the valve 220 is not moved when commanded to. In another example, an adjustable exhaust valve either 196a or 196 be may be reported as stuck when the valve 220, having the stuck valve sensor 226 incorporated within the actuator 222, cannot move along the valve rotational axis 214. In an example, the stuck valve sensor 226 may be positioned on or within the actuator 222, or the stuck valve sensor may be positioned on or within the valve 220 on either an edge or an inner portion of the valve 220 nearest the valve housing of the inner exhaust ports 198a and 198b.

Next, method 400 may move to 412 where the controller 12 via input/output ports 108 may see if there is still a stuck valve code from either the actuator 222 or valve stuck sensor 226. If the controller 12 fails to receive the stuck valve code then the method 400 may end. If there is a stuck valve code then the method 400 may proceed to 413 where the controller 12 may count a first self-healing counter. In an example, at 413, if the controller has not reached a threshold number of self-healing counters, then the routine may return to 410 and running the self-healing routine once again. If, at 413, however, the controller 12 has reached the threshold number of self-healing counters, which may be programmable, the method may proceed to 414. In another example, instead of counting self-healing counters each time the method 400 reaches 413 and returns to 410, the method 400 may instead run a self-healing timer during which the self-healing routine is executed and the self-healing routine may be executed by controller 12 until the stuck valve code may be removed or until the self-healing timer reaches a self-healing timer threshold.

In an example, at 414 the controller 12 may latch a valve trouble code. In an example, the valve trouble code may provide a visual and/or volume notification to the vehicle operator 130 and may only be reset, or unlatched, via an automotive technician or by re-running method 400 either by the vehicle operator 130 command or by manually restarting the vehicle and providing an engine-on event. In an example, the vehicle operator 130 may re-run the method 400 via a command user interface provided in the vehicle.

Next, FIG. 5 shows a graph 500 displaying sample conditions over time during a stuck valve diagnosis for a variable exhaust tuning system. In an example, FIG. 5 illustrates various engine and ambient conditions during the execution of method 300 illustrated in FIG. 3.

In FIG. 5 time is depicted along the x (horizontal) axis while values of each respective parameter are depicted along the y (vertical) axis. At T1 along the time axis, there is an engine-on event and the controller 12 may monitor engine off time and engine start up conditions, as explained above with respect to 302 of method 300. Turning to graph 500, at T1 within the Ambient Temperature sub-graph, 502 shows an ambient temperature threshold with a temperature reading 504 shown to be below the temperature threshold. At T1, within the Exhaust Temperature sub-graph, 506 illustrates rising exhaust temperature as the engine runs while exhaust temperature threshold indicator 508 shows a binary readout representing if the exhaust temperature has reached an exhaust temperature threshold or is below an exhaust temperature threshold. At T1, 506 indicates that the exhaust temperature threshold has not been reached. Continuing at T1 within the Valve Angular Positioning sub-graph, 510 shows a measured valve position, 512 shows an upper threshold for valve position, 514 shows a desired valve position, and 516 shows a lower threshold for valve position. At T1, 510 is currently above the upper threshold for valve position 512 and, as such, at least one entry condition, described above with respect to 304 of method 300, is met. Continuing at T1, fault declaration 518 may be a binary readout shown in Fault Declaration sub-graph which indicates whether there is a fault or no fault.

Turning now to T2 of graph 500, referring to sub-graph Exhaust Temperature it is shown that exhaust temperature 506 has reached the exhaust temperature threshold indicated by 508. In an example, the exhaust temperature threshold may be programmable. Continuing at T2, within the Fault Declaration sub-graph, an error may be declared at 520 due to the measured valve position 510 being outside the upper threshold for valve position 512 and lower threshold for valve position 516. Referring back to FIG. 3, at 306-308 once the exhaust temperature reaches the exhaust threshold then the method no longer suspends setting an error code or declaring a fault within the variable exhaust tuning system.

With reference to 310 of FIG. 3, the method 300 may command valve to commanded valve position at T2 in FIG. 5 within the Valve Angular Positioning sub-graph. In an example, the controller 12 may command the valve 220 via input/output ports 108 to updated desired valve position 524. In an example, based upon 514 changing to 524 upper and lower thresholds for valve position 512 and 516 also change, respectively to updated upper threshold for valve position 522 and updated lower threshold for valve position 526. According to the Valve Angular Positioning sub-graph shown in graph 500 of FIG. 5, the desired and updated valve positions 514 and 524 as well as thresholds 512, 516, 522, 526 may alternate back and forth over time in order to loosen or unstuck a stuck valve i.e. valve 220. In an example, the desired valve position 514 may toggle back and forth between 2 angular valve positions, or in other examples, toggle back and forth between a programmable number of angular valve positions. With reference to 312 of method 300 of FIG. 3, as the measured valve position 510 is not yet within the thresholds 512, 516 and 522, 526, the method may, in an example, proceed to 314 and return to 310 to keep adjusting a commanded, or desired, valve position. In an example, the commanded, or desired, valve position need not be the same valve angular position each and every time the method 300 cycles from 310 to 312 to 314 and back to 310.

Turning now to T3 of FIG. 5, at 528 of the sub-graph Valve Angular Positioning, the measured valve position 510 drops to within the upper and lower thresholds 512, 516, 522, 526. As such, and with reference to FIG. 3, the method discontinues commanding the valve to new positions and the method ends. In an example, FIG. 5 shows 510 at T3 and after T3 as within thresholds 512 and 516 but not exactly matching with desired valve position 514. In some examples, the valve angular positioning may be normalized from 0% to 100%. In an example, the upper threshold for valve position 512 may be 8% or 0.08 greater than the desired valve position 514 and the lower threshold for valve position 516 may be 8% or 0.08 less than the desired valve position 514. In an example, now that 510 falls between 512 and 516, at 530 in the Fault Declaration sub-graph of FIG. 5 the fault declaration is eliminated and the vehicle operator 130 is not alerted to any fault and no error code is latched. In another example, the commanding to different positions of measured valve position 510 between times T2 and T3 may also occur any number of additional instances, and if the valve command counter reaches the command counter threshold, then the method 300 may proceed to 316 and latch an error if the measured valve position 510 fails to fall within the thresholds 512, 516. In an example where the valve command counter reaches the command counter threshold and the error is latched, the vehicle operator 130 may be alerted to the latched error code via volume and/or visual alert within the cabin of the vehicle.

Next, FIG. 6 shows a graph 600 displaying sample conditions over time during a stuck valve diagnosis for a variable exhaust tuning system not having a valve angular positioning sensor. In an example, FIG. 6 illustrates various engine and ambient conditions during the execution of method 400 illustrated in FIG. 4. In FIG. 6 time is depicted along the x (horizontal) axis while values of each respective parameter are depicted along the y (vertical) axis At T1 along the time axis, there is an engine-on event and the controller 12 may monitor engine off time and engine start up conditions, as explained above with respect to 402 of method 400. In an example, one or more entry conditions may be met at engine start up, according to 404 of method 400, such as an actuator 222 operating valve 220 not being able to move. Turning to graph 600, at T1 within the Ambient Temperature sub-graph, 602 shows an ambient temperature threshold with a temperature reading 604 shown to be below the temperature threshold. At T1, within the Exhaust Temperature sub-graph, 606 illustrates rising exhaust temperature as the engine runs while exhaust temperature threshold indicator 608 shows a binary readout representing if the exhaust temperature has reached an exhaust temperature threshold or is below an exhaust temperature threshold. At T1, an exhaust temperature indicator 608 indicates that the exhaust temperature threshold has not been reached. Continuing at T1, fault declaration 610 may be a binary readout shown in Fault Declaration sub-graph which indicates whether there is a fault or no fault.

Turning now to T2 of graph 600, at 612 the exhaust temperature indicator 608 shows that an exhaust temperature threshold has been reached. Referring to 406 and 408 of method 400, once the exhaust temperature has been reached, the method 400 may advance to 410 wherein the controller 12 may execute a self-healing routine via input/output ports 108. As shown by 614, the controller 12 may track self-healing time elapsed as the self-healing routine is executed. Turning next to T3 of graph 600 in the Fault Declaration sub-graph, at 616 the method may declare a fault and/or issue a stuck valve code indicated by the fault declaration 610 showing a fault. Referring to method 400 of FIG. 4, the method may declare, or latch, a fault at 412 if the valve is stuck. In an example, as explained above, the controller 12 may recognize the valve as stuck and latch a fault if the valve 220 is unable to move via actuator 222. In an example, when the valve 220 cannot move via actuator 222, the controller 12 may recognize that the valve is in a non-normal state of operation. Continuing at T3, 614 may continue to increase as the self-healing routine may continue, or, in an example when the self-healing routine has already run once, the self-healing routine may be executed via controller 12 an additional programmable number of times.

Turning next to T4, at 618 the fault declaration shown at 616 may be removed due to continued self-healing routine after T3. In an example, the fault declaration may be removed or canceled at 618 once the valve 220 may become movable via actuator 222. In an example, when the fault declaration is removed at 618 the self-healing procedure may also end as shown at 620 due to the valve 220 functionality being restored.

As another example, the controller 12 may make a logical determination (e.g., regarding a position of one or more adjustable exhaust valve actuators 224a, 224b, 222) based on logic rules that are a function of parameters illustrated in FIGS. 5 and 6. The controller may then generate a control signal that is sent to, for example, actuators 224a, 224b, 222. In another example, microphone 195 may provide volume input to controller 12 via input/output ports 108. In an example, controller 12 may include volume parameters associated with commanded positions of valve 220.

FIGS. 1, 2A, and 2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way methods and devices are provided to adjust and diagnose a variable exhaust tuning system having one or more stuck valves, in some cases stuck valves may be caused due to ice formation and may cause a false stuck valve error. The methods and devices enable additional advantages by providing both direct (valve positioning, stuck valve, etc.) and indirect valve (volume input, temperature input, pressure input) diagnostics. The technical effect of executing the herein described valve diagnostics is that fewer false errors are issued and the noise, vibration and harshness (NVH) experience for the vehicle operator 130 is improved.

In one example, a method for an adjustable engine-exhaust valve is provided, comprising: monitoring engine off time and checking for one or more entry conditions at engine startup, operating with the valve being stuck, and responsive to the valve being stuck: during selected engine start-up conditions and after sufficient engine-off time, setting an error code associated with the one or more entry conditions upon an exhaust temperature reaching an exhaust temperature threshold, commanding the adjustable exhaust valve to a first commanded valve position, and based upon a current valve position of the adjustable exhaust valve being within a tolerance band of a first commanded valve position, clearing the error code. In any or all of the preceding example, the method may optionally or additionally include the one or more entry conditions further comprising any of an actuator of the adjustable exhaust valve reporting a stuck status; a humidity sensor reading a water concentration higher than a threshold water concentration at the most recent engine-off time; a vehicle soak time being greater than a calculated amount of time for ice formation while engine is off; a current ambient temperature being either greater than or less than a threshold temperature; and an exhaust volume level failing to fall between a first volume threshold and a second volume threshold. In any or all of the preceding examples, the method may further comprise calculating the calculated amount of time for ice formation based upon a difference in temperature of exhaust at an engine-off event and at the next engine-on event. In any or all of the preceding examples, the method may further comprise measuring the exhaust volume level via a microphone attached to a bottom surface of the vehicle. In any or all of the preceding example, the method may optionally or additionally include the exhaust temperature is measured by temperature sensors within the walls of the adjustable exhaust valve. In any or all of the preceding examples the method may optionally or additionally include wherein the current valve position of the adjustable exhaust valve is not within the tolerance band of the first commanded valve position then adding a valve command counter. In any or all of the preceding examples, the method may further comprise after adding the valve command counter then again commanding the adjustable exhaust valve to the first commanded valve position. In any or all of the preceding examples, the method may further comprise upon reaching a command counter threshold latching a valve error code. In any or all of the preceding examples, the method may further comprise alerting a vehicle operator within the cabin of the vehicle to the valve error code via a volume and/or visual alert.

In another example, a method for troubleshooting an adjustable exhaust valve of an engine is provided, comprising: monitoring engine off time and checking for one or more entry conditions at engine startup, executing a stuck valve check, operating with exhaust temperature rising up to and above an exhaust temperature threshold; setting a stuck valve error code associated with the one or more entry conditions upon the exhaust temperature reaching the exhaust temperature threshold, running a valve self-healing routine, checking a first time for a stuck valve code of the adjustable exhaust valve, and based upon failing to receive the stuck valve code, clearing the error code. In any or all of the preceding examples, the method may optionally or additionally include the valve self-healing routine comprises toggling the adjustable exhaust valve between open and closed states a programmable number of times. In any or all of the preceding examples, the method may further comprise issuing the stuck valve code at an actuator of the adjustable exhaust valve when the actuator cannot move. In any or all of the preceding examples, the method may further comprise based upon receiving the stuck valve code, counting a first self-healing counter. In any or all of the preceding examples, the method may further comprise running the self-healing routine again and checking an additional time for the stuck valve code.

In any another example, a device for adjusting and diagnosing a valve position of a post-catalyst variable exhaust tuning system to control an exhaust backpressure is provided, comprising: a resonator fluidically connected to a muffler having a first and a second muffler exhaust port, an adjustable exhaust valve included within the first muffler exhaust port adjusted via a valve actuator communicatively coupled to a controller, and a positioning sensor included within the adjustable exhaust valve. In any or all of the preceding examples, the device may optionally or additionally include that the adjustable exhaust valve is a butterfly valve. In any or all of the preceding examples, the device may further comprise a humidity sensor to estimate an engine off estimation of a mass of water remaining in the device. In any or all of the preceding examples, the device may further comprise a rotational rod connected to both the adjustable exhaust valve and the valve actuator for rotating the adjustable exhaust valve. In any or all of the preceding examples, the device may further comprise a microphone attached to a bottom surface of the vehicle for obtaining volume input of the variable exhaust tuning system. In any or all of the preceding examples, the device may further comprise a pressure and temperature sensor included within the muffler for tracking both temperature and pressure of exhaust gases of the variable exhaust tuning system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an adjustable engine-exhaust valve, comprising:
   via a controller including executable instructions stored in non-transitory memory,
   monitoring engine off time and checking for one or more entry conditions at engine startup,
   operating with the adjustable engine-exhaust valve being stuck, and responsive to the adjustable engine-exhaust valve being stuck:
      during selected engine start-up conditions and after sufficient engine-off time, setting an error code associated with the one or more entry conditions upon an exhaust temperature sensed via a temperature sensor reaching an exhaust temperature threshold,
      commanding the adjustable engine-exhaust valve to a first commanded valve position, and
      based upon a current valve position of the adjustable engine-exhaust valve being within a tolerance band of a first commanded valve position, clearing the error code.

2. The method of claim 1, wherein the one or more entry conditions comprises any of
   an actuator of the adjustable exhaust valve reporting a stuck status;
   a humidity sensor reading a water concentration higher than a threshold water concentration at the most recent engine-off time;
   a vehicle soak time being greater than a calculated amount of time for ice formation while engine is off;
   a current ambient temperature being either greater than or less than a threshold temperature;
   and an exhaust volume level failing to fall between a first volume threshold and a second volume threshold.

3. The method of claim 2, further comprising calculating the calculated amount of time for ice formation based upon a difference in temperature of exhaust at an engine-off event and at the next engine-on event.

4. The method of claim 2, further comprising measuring the exhaust volume level via a microphone attached to a bottom surface of the vehicle.

5. The method of claim 1, wherein the exhaust temperature is measured by temperature sensors within the walls of the adjustable exhaust valve.

6. The method of claim 1, wherein the current valve position of the adjustable exhaust valve is not within the tolerance band of the first commanded valve position then adding a valve command counter.

7. The method of claim 6, further comprising after adding the valve command counter then again commanding the adjustable exhaust valve to the first commanded valve position.

8. The method of claim 6, further comprising upon reaching a command counter threshold latching a valve error code.

9. The method of claim 6, further comprising alerting a vehicle operator within the cabin of the vehicle to the valve error code via a volume and/or visual alert.

10. A method for troubleshooting an adjustable exhaust valve of an engine, comprising:
    via a controller including executable instructions stored in non-transitory memory,
    monitoring engine off time and checking for one or more entry conditions at engine startup,
    executing a stuck valve check,
    operating with exhaust temperature rising up to and above an exhaust temperature threshold;
    setting a stuck valve error code associated with the one or more entry conditions upon the exhaust temperature sensed via a temperature sensor reaching the exhaust temperature threshold,
    running a valve self-healing routine,
    checking a first time for a stuck valve code of the adjustable exhaust valve, and
    based upon failing to receive the stuck valve code, clearing the error code.

11. The method of claim 10, wherein the valve self-healing routine comprises toggling the adjustable exhaust valve between open and closed states a programmable number of times.

12. The method of claim 10, further comprising issuing the stuck valve code at an actuator of the adjustable exhaust valve when the actuator cannot move.

13. The method of claim 10, further comprising based upon receiving the stuck valve code, counting a first self-healing counter.

14. The method of claim 13, further comprising running the self-healing routine again and checking an additional time for the stuck valve code.

15. A device for adjusting and diagnosing a valve position of a post-catalyst variable exhaust tuning system to control an exhaust backpressure, comprising:
    a resonator fluidically connected to a muffler having a first and a second muffler exhaust port,
    an adjustable exhaust valve included within the first muffler exhaust port adjusted via a valve actuator communicatively coupled to a controller, a positioning sensor included within the adjustable exhaust valve, the controller including executable instructions stored in non-transitory memory that cause the controller to:
    check for one or more entry conditions at engine startup,
    operate an engine with the adjustable exhaust valve being stuck, and responsive to the adjustable exhaust valve being stuck:
       during selected engine start-up conditions and after sufficient engine-off time, set an error code associated with the one or more entry conditions upon an exhaust temperature reaching an exhaust temperature threshold, command the adjustable exhaust valve to a first commanded valve position, and based upon a current valve position of the adjustable exhaust valve being within a tolerance band of a first commanded valve position, clear the error code.

16. The device of claim 15, wherein the adjustable exhaust valve is a butterfly valve.

17. The device of claim 15, further comprising a humidity sensor to estimate an engine off estimation of a mass of water remaining in the device.

18. The device of claim 15, further comprising a rotational rod connected to both the adjustable exhaust valve and the valve actuator for rotating the adjustable exhaust valve.

19. The device of claim 15, further comprising a microphone attached to a bottom surface of the vehicle for obtaining volume input of the variable exhaust tuning system.

20. The device of claim 15, further comprising a pressure and temperature sensor included within the muffler for tracking both temperature and pressure of exhaust gases of the variable exhaust tuning system.

* * * * *